US011212808B2

(12) United States Patent
Alsina et al.

(10) Patent No.: US 11,212,808 B2
(45) Date of Patent: *Dec. 28, 2021

(54) COORDINATED CONTROL OF MEDIA PLAYBACK

(71) Applicant: Apple Inc., Cupertino, CA (US)

(72) Inventors: Thomas Alsina, Mountain View, CA (US); Szu-Wen Huang, Union City, CA (US); Steven P. Bischoff, San Jose, CA (US); Nicholas J. Paulson, San Francisco, CA (US); Gregory R. Chapman, San Jose, CA (US); David P. Saracino, San Francisco, CA (US); Jason Ketterman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/819,597

(22) Filed: Mar. 16, 2020

(65) Prior Publication Data

US 2020/0221443 A1 Jul. 9, 2020

Related U.S. Application Data

(63) Continuation of application No. 15/425,298, filed on Feb. 6, 2017, now Pat. No. 10,624,099, which is a
(Continued)

(51) Int. Cl.
*H04W 72/04* (2009.01)
*G11B 27/10* (2006.01)
(Continued)

(52) U.S. Cl.
CPC ......... *H04W 72/048* (2013.01); *G11B 27/102* (2013.01); *H04L 12/403* (2013.01);
(Continued)

(58) Field of Classification Search
None
See application file for complete search history.

(56) References Cited

U.S. PATENT DOCUMENTS 7,516,078 B2 4/2009 Dhawan et al.
9,078,072 B2 7/2015 Sundaresan et al.
(Continued)

OTHER PUBLICATIONS

International Patent Application No. PCT/US2016/049410; Int'l Search Report and the Written Opinion; dated Nov. 28, 2016; 11 pages.
(Continued)

*Primary Examiner* — Mohammad S Adhami
(74) *Attorney, Agent, or Firm* — BakerHostetler

(57) ABSTRACT

Methods and systems provide for coordinated control between multiple devices of playback of a media track or playlist. The multiple devices may form an ad-hoc network for sharing control of media. A control device may coordinate control of the playlist and facilitate playback of the media at a playback device. Then when the control device leaves the group, a second device in the group will seamlessly become the control device and control playback and playlist coordination. The playback device may also be the control device. The playback advice may be a network-enabled speaker. Where the playback device is separate from the control device, the playback device may maintain sufficient information to operate without a control device until a new control device is selected.

24 Claims, 6 Drawing Sheets

Related U.S. Application Data continuation of application No. 14/871,842, filed on Sep. 30, 2015, now abandoned.

(51) Int. Cl.
  *H04L 12/403* (2006.01)
  *H04W 4/021* (2018.01)
  *H04W 8/00* (2009.01)
  *H04W 84/18* (2009.01)

(52) U.S. Cl.
  CPC ........... *H04W 4/021* (2013.01); *H04W 8/005* (2013.01); *H04W 84/18* (2013.01)

(56) References Cited

U.S. PATENT DOCUMENTS

| | | |
|---|---|---|
| 10,624,099 B2 * | 4/2020 | Alsina ................... H04W 8/005 |
| 2005/0286546 A1 | 12/2005 | Bassoli et al. |
| 2006/0270395 A1 | 11/2006 | Dhawan et al. |
| 2007/0038999 A1 | 2/2007 | Millington |
| 2010/0095332 A1 | 4/2010 | Gran et al. |
| 2013/0254663 A1 | 9/2013 | Bates et al. |
| 2014/0122589 A1 | 5/2014 | Fyke et al. |
| 2015/0312299 A1 | 10/2015 | Chen |
| 2016/0150011 A1 | 5/2016 | Le Nerriec et al. |

OTHER PUBLICATIONS

International Patent Application No. PCT/US2016/049410; Int'l Preliminary Report on Patentability; dated Apr. 12, 2018; 7 pages.

* cited by examiner

100

300

500

600

COORDINATED CONTROL OF MEDIA PLAYBACK

REFERENCE TO RELATED APPLICATIONS

This application is a Continuation of application Ser. No. 15/425,298, filed on Feb. 6, 2017, which is a Continuation of application Ser. No. 14/871,842 Sep. 30, 2015, the disclosures of which are incorporated by reference in their entirety.

BACKGROUND

The present disclosure relates to multimedia processing and sharing. More specifically, it relates to methods and systems for playback and control of multimedia data.

Music is played in multiple ways from multiple types of devices. For example, a user may plug or otherwise connect their smartphone into a speaker or television or computer and use the device's speakers to broadcast their music to the room. However, when the user walks away or otherwise takes their device out of the room, or when the device is used for a purpose other than music playback, such as receiving a phone call, the playback is interrupted. Thus, the inventors perceived a need in the art for controlling playback of a shared multimedia stream from any of several participants in a group.

DETAILED DESCRIPTION

Figure 1:
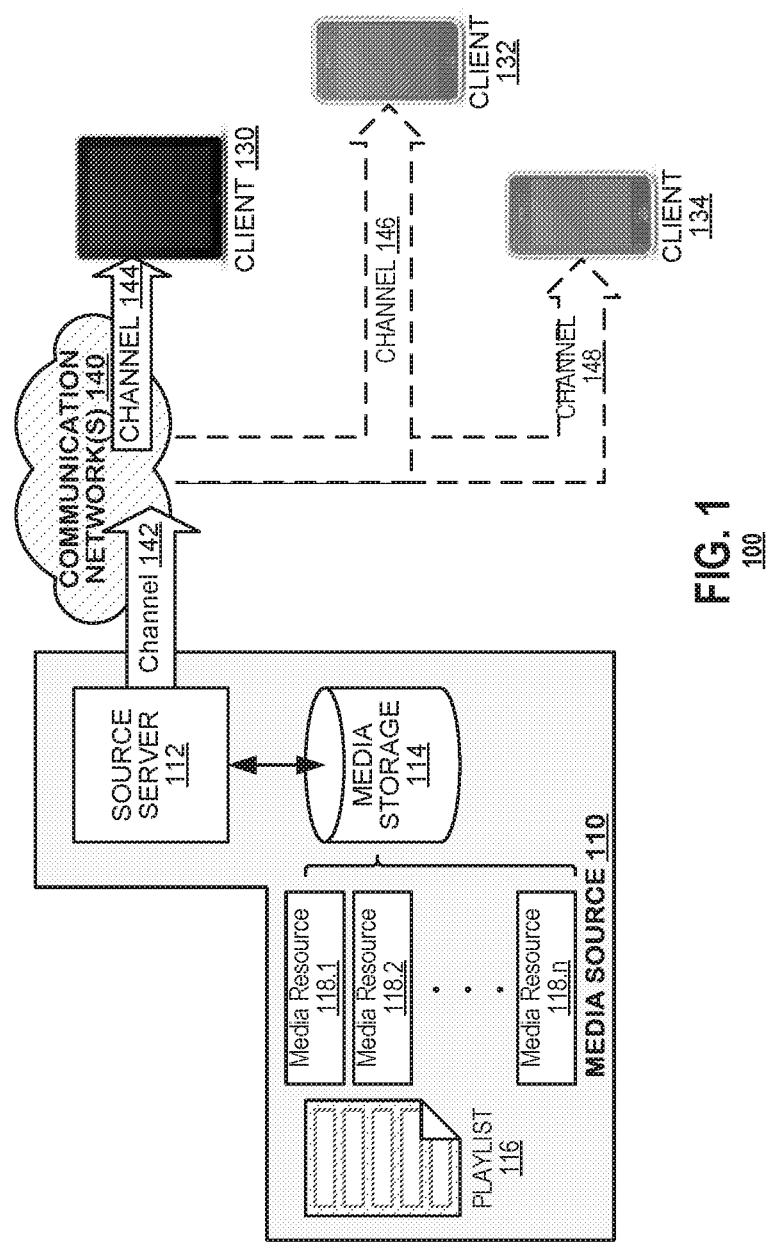
FIG. 1 is a simplified functional block diagram of an exemplary system according to an embodiment of the present disclosure.

Methods and systems provide for coordinated control between multiple devices of playback of a media track or playlist. The multiple devices may form an ad-hoc network for sharing control of media. Each device in the ad-hoc network may take on a role. For example, in a first mode of operation, a device may play media. The device may be referred to as a "playback device" when the device is in the first mode of operation. In a second mode of operation, a device may control playback of media. The device may be referred to as a "control device" when the device is in the second mode of operation. In an embodiment, each device of a group of devices may be a playback device. In an alternative embodiment, a group of devices may include a control device (also referred to as "a master device"). The control device may coordinate control of the playlist and facilitate playback of the media at a playback device. Then when the control device leaves the group, a second device in the group will seamlessly become the control device and control playback and playlist coordination. The playback device may also be the control device. The playback device may be a network-enabled speaker. Where the playback device is separate from the control device, the playback device may maintain sufficient information to operate without a control device until a new control device is selected.

According to an embodiment, in a system having a plurality of connected devices, each device will include a memory device to store a playlist identifying at least one media track for playback on one of the plurality of connected devices and a processor to manage the playlist and playback of tracks. At least one, but potentially a plurality of devices will also store a member list that identifies a plurality of member devices that form a group. The processor of a first one of the plurality of devices will be used to control playback of the at least one media track and when the first one of the plurality of devices is removed from the group, a second one of the plurality of devices will assume control of the playback. For example, the processor may implement AV Playlist and an AV Player object to interface with the user to present and modify a playlist, a FIG Playlist Controller object and Player Plugin object to identify the location of a track on the playlist in storage, and retrieve the stored track, and a player to playback the track.

According to an embodiment, information may be shared between devices. For example, the processor of a device may be configured to facilitate the capture of a current state of the playlist, credentials that will be used to authorize playback of the track, or member list information identifying each member device in the group and then to transfer the information to another device. According to an embodiment, upon detecting the addition of a new device to the group, the processor of one of the devices is configured to add the new device to the member list by updating the member list at each of the member devices and to facilitate transfer of information regarding the current state of the playlist from one of the plurality of member devices to the new device.

According to an embodiment, a playlist may be a fixed list of tracks edited and added to by one or more users or may be an infinite list that is dynamically generated, for example when the playlist is generated by a radio application such as iTunes Radio. Then the playlist will be continuously updated as the radio application adds new songs to the playlist. Users may still interact with a dynamic playlist as described herein, for example by pausing or skipping or removing tracks from the playlist.

According to an embodiment, a track may be a single song, but additional types of tracks are also anticipated by this disclosure. For example, a track may be an ad, a commentary (for example by a DJ or other user), a video (such as a music video, a TV show, or a movie), or other segment of audio and/or video content.

FIG. 1 is a simplified functional block diagram of an exemplary system 100 according to an embodiment. As shown in FIG. 1, the system may include a media source 110 and one or more client devices 130, 132, and 134 interconnected via a communication network 140. The media source 110 may include a source server 112 that distributes the media resources to the client devices of the group 130, 132, 134. As part of the media source, a storage system 114 may store a copy of the playlist 116 for multiple media resources, such as an audio file or a movie file, and the available media resources 118.1-118.*n*. The playlist may include identifiers for one or more media resources. According to an embodiment, the media resources stored in the storage system 114 may be encoded according to any known coding protocol, for example H.264 or HEVC, for transmission to the client devices 130, 132, 134.

According to an embodiment, a master playlist 116 may be stored at a media source 110 and may identify segments or tracks of multimedia files that are stored by a server 112 of the media source 110. In an embodiment, the master playlist 116 may define an order in which multimedia files are distributed to the one or more client devices 130, 132, and 134. The media source 110 may transmit the media resources 118.1-118.n to devices in the group and on the communication network 140 via a channel 142. In an embodiment (not shown), the media source 110 may be played on one or more client devices, e.g., the one or more client devices 130, 132, and 134.

The client device(s) 130 represent media players that download coded multimedia data from the media source 110, decode the coded multimedia resources and render them for playback. The playback of the received media resources may be coordinated as described herein.

Figure 2:
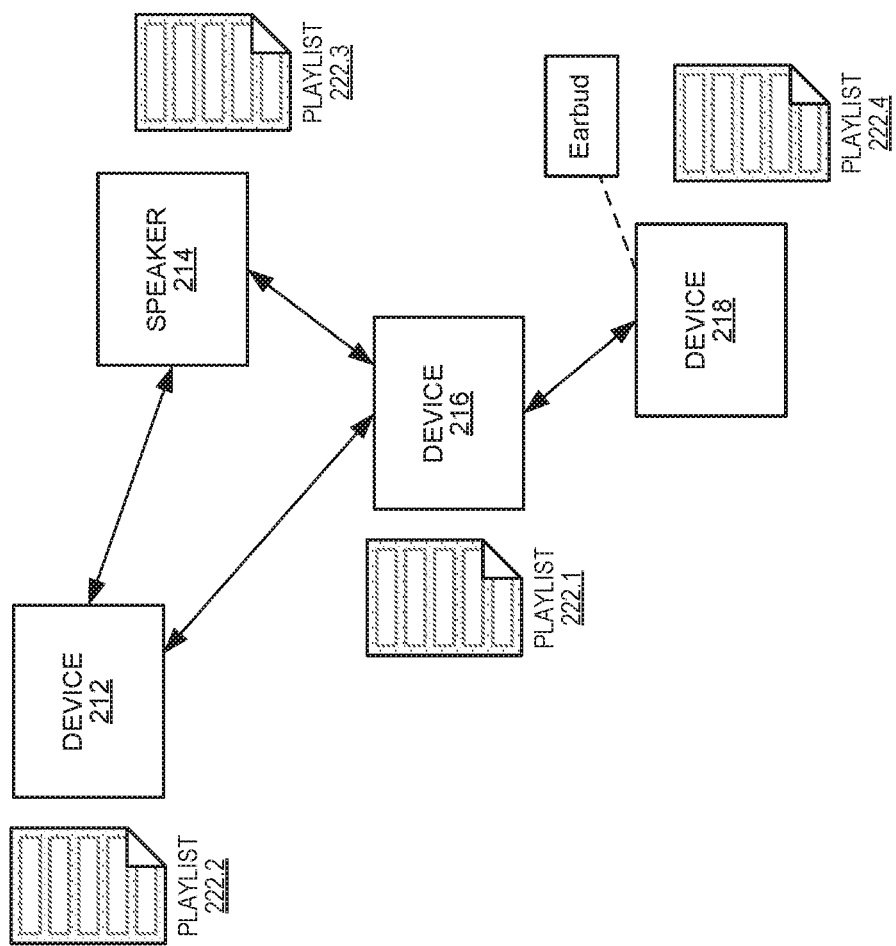
FIG. 2 illustrates an exemplary system of connected devices according to an example embodiment of the present disclosure.

FIG. 2 illustrates an exemplary system 200 of connected devices according to an example embodiment. The plurality of devices in the system may be connected via a communications network, such as via the Internet, Bluetooth, or other method of connecting devices or as an ad hoc peer-to-peer network. For example, the devices may be compliant with one or more wireless communication protocols, such as Bluetooth or WiFi protocols (e.g., IEEE 802.11a, 802.11b, 802.11g, 802.11n and 802.11ac). In some embodiments, the devices may also be adapted to support proprietary peer-to-peer protocols such as Apple® Wireless Direct Link (AWDL). Other similar protocols also may be adopted in order to facilitate peer-to-peer communications.

In the example communications network 200 illustrated in FIG. 2, a plurality of devices 212, 214, 216, and 218 are connected, in an "ad-hoc" or "peer-to-peer" arrangement, e.g., via WiFi, and may exchange data in a full or partial mesh configuration. For example, device 212 may be connected to devices 214 and 216 through a series of peer-to-peer communication links (represented by the double arrows).

Collectively, the plurality of devices 212, 214, 216, and 218 engaged in communication may be referred to as a "group." For the purposes of the present discussion, a "group" of devices simply refers to two or more devices that are actively engaged in communication.

The plurality of devices 212, 214, 216, 218 connected via the network may include personal devices, such as a handheld smart phone or other network enabled handheld device, a personal computer or laptop, or one or more speakers. For example, device 214 may be a Bluetooth enabled speaker that projects a shared audio experience.

In an embodiment (not shown), multiple devices may be connected to and in communication with a single device but not with other devices in the group. For example, if device 212 is acting as the master device (also referred to as "a control device"), devices 214 and 216 may be in communication with device 212, but not with each other.

According to an embodiment, one or more of the devices 212, 214, 216, or 218, may be in communication with a media source such as described with reference to FIG. 1. Any device connected to the media source can download the media resources required to complete the playlist playback. Any devices that are not connected to the media source, for example due to connection or data limitations, may receive the media resources from another source, such as a local storage or from one of the other group devices as needed.

However the devices of the group are connected, the master device will manage a playlist for the group. The playlists that are used or displayed at the other devices may be coordinated with the playlist maintained by the master device. Synchronized playlists may be maintained as described in U.S. patent application entitled "Earbud Sharing," filed concurrently herewith, the disclosure of which is incorporated herein in its entirety. As described therein, group members may modify the group playlist and such modifications will be propagated to the group in a real-time manner. Editing and/or control options for a group member may include pausing, rewinding, fast forwarding, skipping, adding, deleting, etc. For a single device playing the synchronized playlist, modifications to the playlist will be reflected in the playback of the multimedia.

Figure 3:
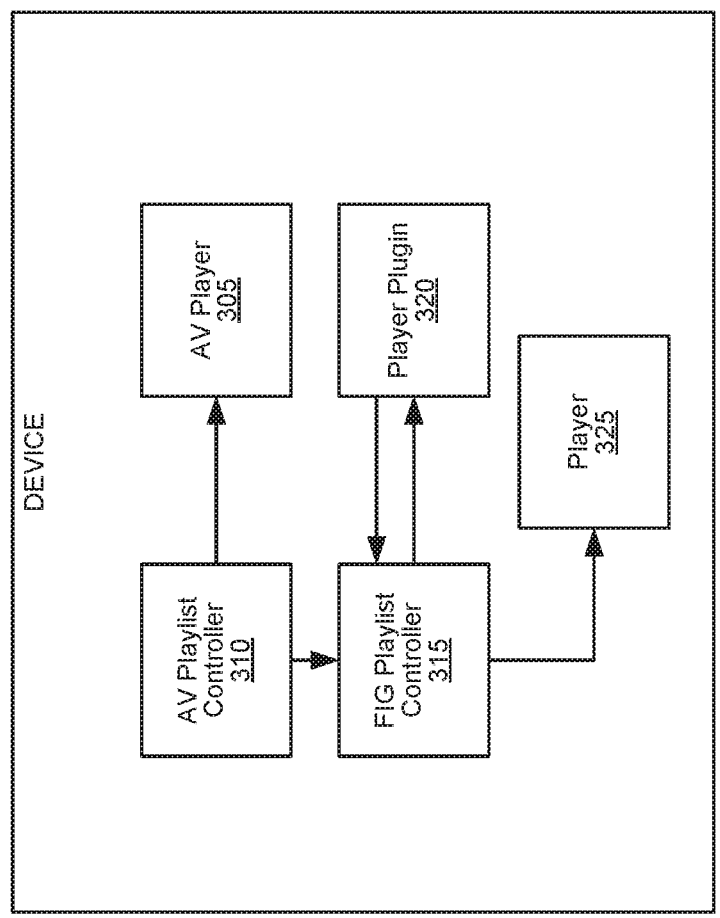
FIG. 3 illustrates an exemplary device according to an embodiment of the present disclosure.

FIG. 3 illustrates an exemplary device 300 according to an embodiment of the present disclosure. As shown in FIG. 3, at least one device in the group will include an AV Player 305 that provides an interface for controlling playback of items in the playlist, for example, by providing functionalities for playing, pausing, or skipping a track. The AV Player 305 may be further controlled by an AV Playlist Controller 310 that manages and maintains the playlist, for example, by allowing users to insert or remove tracks or to otherwise manipulate the playlist. The AV Playlist Controller 310 may further interact with a FIG Playlist Controller object (FPC) 315. An FPC object is used by a device to access tracks at a known location and retrieve the track for playback at the device.

According to an embodiment, a device may operate in various roles. For example, in one mode of operation, the device may have a controller role, while in another mode of operation, the device may have a player role. In an embodiment, a device may both control and playback media. For simplicity, when a device takes on a playing role, it may be referred to as "a playing device" or a "playback device." When a device takes on a controlling role, it may be referred to as a "control device" or a "controller device."

At the playing device, the FPC 315 interacts with a player plugin (PP) 320 to identify the location of the next track, e.g., a Uniform Resource Locator (URL) or other indicator in the playlist will point to the location, either local or remote, of the track. The PP 320 feeds the URL information to the FPC 315, which in turn accesses the track at the identified URL and feeds the URL backed track to the player 325. The player 325 then performs the playback of the track.

Figure 4:
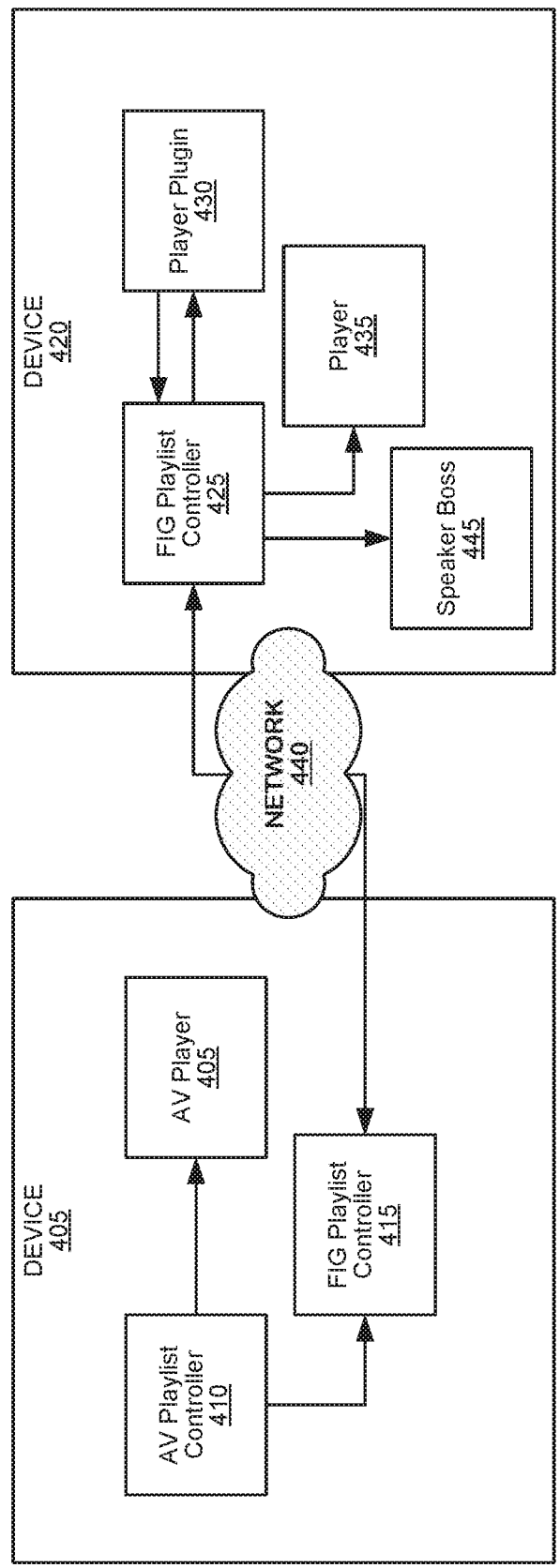
FIG. 4 illustrates an exemplary pair of devices in communication according to an embodiment of the present disclosure.

FIG. 4 illustrates an exemplary pair of devices in communication according to an embodiment. As shown in FIG. 4, with two devices operating together, both a device managing the playlist 405 and a playing device 420 may include an FPC 425. At the controller device 405, the FPC 415 communicates with the FPC 425 at the player device 420 to identify the necessary tracks. Then the FPC 425 interacts with the player plugin (PP) 430 to identify the URL of the track and the PP 430 feeds the URL information to the FPC 425, which in turn accesses the track at the identified URL and feeds the URL backed track to the player 435. The player 435 at the playing device 420 then performs the playback of the track.

The described embodiments may be adopted by portable, wireless, and/or stationary communication devices. Such devices include mobile phones, tablets, laptops, desktops, Internet-enabled televisions, wireless networking devices (e.g., a router), game terminals, speaker systems, and the like which may include one or more accessory devices, such as headsets, speakers, keyboards, or other input or output accessories.

A plurality of devices may communicate with one another in a peer-to-peer arrangement via one or more communication protocols, such as WiFi, and may communicate with wireless accessory devices via a short-range communication protocol. Each user in a group connected via a communication network may then interact with a playlist that is playing through one or more feedback devices. For example, a user may be managing a playlist via a smartphone while the music playback is broadcast from one or more speakers. If multiple speakers are being used for playback, the playback must be closely synchronized. For example, an anchor time for beginning or resuming playback of a track at each playback device may be distributed to all devices in the group and playback will be coordinated at each playback device in accordance with an anchor time.

Methods of Clock Synchronization across multiple devices are described in U.S. patent application entitled "Clock Synchronization Techniques Including Modification of Sample Rate Conversion," filed concurrently herewith, the disclosure of which is incorporated herein in its entirety.

According to an embodiment, playback devices may be co-located, such as a pair of speakers in one room, or separately located, such as a pair of speakers, each in a different room or location. According to an embodiment, playback may be split into zones, for example different locations or different rooms. Then the master device may manage playback for every zone. According to an embodiment, each zone may playback different content or otherwise have different playlists and each zone may be separately controlled. Additional topologies for zones and the management of playback in different zones will be understood to work with the devices described herein. Communication channels may be formed between group devices through a scanning and discovery process that establishes a connection between the two devices or through other known means of establishing a connection.

Figure 5:
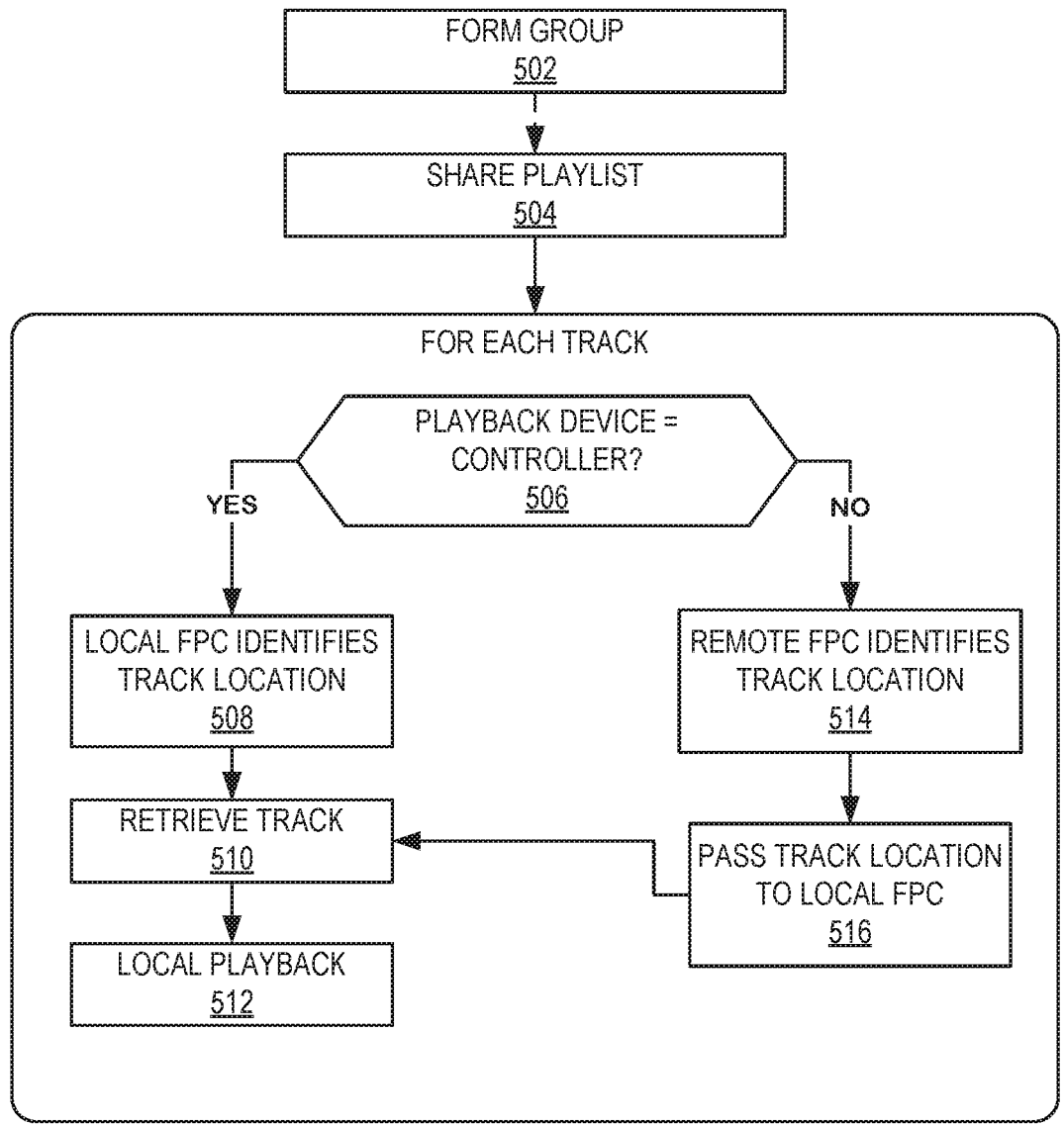
FIG. 5 illustrates an exemplary method for playback of multimedia content according to embodiment of the present disclosure.

FIG. 5 illustrates an exemplary method 500 for playback of multimedia content according to an embodiment of the present disclosure. As shown in FIG. 5, preliminarily, a group may be formed for managing a playlist (block 502). When two or more devices are connected to manage playback of a playlist, a group will be formed. In an embodiment, the group initiator may be set as the master device. Or, in an embodiment, the group device with the best features, for example with the best network connection or the most processing capacity, may be set as the master device. Additionally, at least one device in the group will be identified as a playback device. The master device and the playback device can be the same device.

Once a group is formed, the playlist may then be shared with each device in the group (block 504). As previously noted, the playlist may be maintained by a master device and may be manipulated by any member of the group. A member may have access to an interface at his/her device that provides access to the playlist and/or the currently playing track. The actions and commands that the member performs on the device will be transmitted to group by synchronizing the playlist.

Then the playlist may be played among the group devices. For each track on the playlist, when a playback device is also a controller device, e.g., the playback device includes an AV Playlist Controller and AV Player (block 506), the local FPC works with a local plugin to identify the location of the track, e.g., the URL of the track (block 508). The local plugin then feeds the track information to the FPC, which in turn accesses and retrieves the track at the identified URL and feeds the URL backed track to the player (block 510). The local player then performs the playback of the track (block 512).

When a playback device is a passive playback device, an FPC at a controller device facilitates identification of the next track in the playlist (block 514) and passes a track identifier to the playback device (block 516). The FPC local to the playing device then works with a local plugin to identify the location of the track (block 508). The local plugin then feeds the track information to the local FPC, which in turn accesses and retrieves the track at the identified URL and feeds the URL backed track to the local player (block 510). The local player then performs the playback of the track at the playing device (block 512).

According to an embodiment, if the playback device is not connected to a controller device, the FPC local to the playback device may perform the necessary track identification. Using a local version of the playlist, the playback device may retrieve and play the tracks of the playlist. In this way the master device can offload the bulk of the playback work to the playback device. Then if the master device leaves the group, enters a sleep mode, gets a phone call, or some other event occurs that would cause the master device to drop control of the playlist, the playback device may continue broadcasting the tracks of the playlist. However, in an embodiment, the playback device may not have the capability to manage and synchronize the playlist among the group devices but will retrieve tracks based on a local version of the playlist. That local version may then be overwritten by a master device or other group member.

Figure 6:
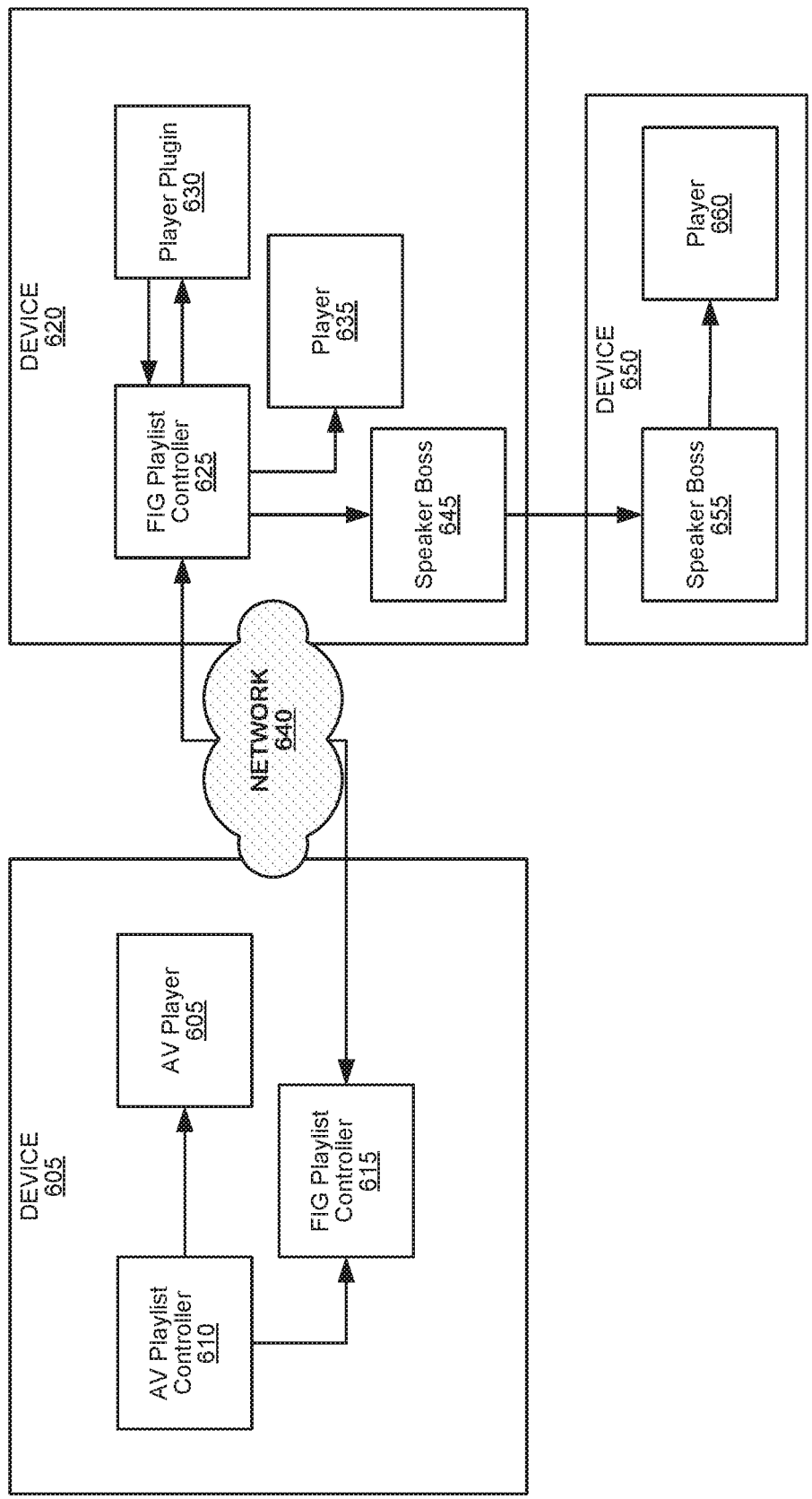
FIG. 6 illustrates an exemplary system having multiple playback devices according to an embodiment of the present disclosure.

FIG. 6 illustrates an exemplary system 600 having multiple playback devices according to an embodiment of the present disclosure. As shown in FIG. 6, multiple devices may operate together, including a controller device managing the playlist 605 and multiple playing devices 620, 650. At the controller device 605, the FPC 615 communicates with the FPC 625 at a first one of the player devices 620 to identify the necessary tracks. In an embodiment, one of the player devices may be a master player device and the other player devices may be subordinate or otherwise controlled by the master player device. Then the FPC 625 at the master player device 620 interacts with the player plugin (PP) 630 to identify the URL of the track and the PP 630 feeds the URL information to the FPC 625, which in turn accesses the track at the identified URL and feeds the URL backed track to the player 635 and to a speaker boss object 645 for the first device. The speaker device 645 may then pass the track to the subordinate device 650. A speaker boss connection 655 at the subordinate device 650 may coordinate playback at the subordinate device 650 with the playback at the master device 620 so that the playback is appropriately synchronized. The player 635 at the playing device 620 and the player 660 at the subordinate device 650 then perform the playback of the track.

When two or more devices are connected, they may form a group. A group may be created in a variety of ways. For example, information about other devices may be obtained through a scanning and discovery process such that a client device may identify and enumerate the groups or other devices with which the client device may join or otherwise have access to. The client device may look for known contacts in the vicinity or a group member may send an invitation to one or more client devices inviting new members to the group.

In an embodiment, a group member may locate one or more passive devices, such as a speaker. For example, a user interface of the group member's device may list all devices that are detectable by their device, such as speakers or other systems that can assist in the playback of the playlist. Then, from this interface, the user may select one or more devices to add to the group. The added passive device may then become a playback device, playing the tracks of the playlist as described herein.

During formation of the group, a group list will be created. The group list of each of the devices within the group may be maintained by at least one of the client devices. According to an embodiment, each of the client devices within the group also may store and maintain a group list. The group list may include an identification and/or address of each device in the group. Then each subsequent member that joins the group or device added to the group will be added to the group list. For example, a group list may initially be generated when two devices form a group, and entries may be added to or removed from the group list when a device joins or leaves the group.

In an embodiment, a group may be formed when a user connects a master device controlling the playlist to a playback device such as a speaker or other playback device. In response to the formation of the group the playlist may then be shared with members of the group, including those members who join the group subsequent to its formation. In an embodiment, the group playlist may include identifiers or pointers to one or more media resources such as the media resources stored at a media resource as shown in FIG. 1. According to an embodiment, each device in the group may locally store the group playlist. The master device may create, distribute and maintain the group list as well as the group playlist.

According to an embodiment, a single device may be in control of the playlist and playback of the media and a group may be formed when a second device connects with the first device. The second device may then access and modify the playlist.

Once the group is created, playback of the playlist may be managed as described herein. In order to ensure that each playback device has access to every track on the playlist, the master device may find a copy of each music track on the playlist and distribute a copy (or a pointer to a copy and associated credentials as appropriate) to each playback device of the group. The copy may be stored in a networked or local media storage accessible by at least one device in the group, or may be stored on one or more of the group devices. If stored on a group device, the master device may receive a copy of the track, and any related permissions necessary to play the track, and propagate the track and related permissions to the playback devices of the group. If a playback device has its own copy of the track, the local copy may be played rather than receiving a copy from the master device. If the track is stored on a network accessible media storage, a pointer to the stored track may be propagated to the playback device(s).

Multiple copies of a track may be available to the group. For example, a copy of the requested track may be available from one or more group devices, from storage such as the cloud, or from a device that is connected to one of the group devices but is not a group device itself. For example, a smart phone group device may have access to tracks stored on a desktop computer. The best available copy of the track may be retrieved and distributed among the group devices for synchronized playback.

According to an embodiment, different group members may access different tracks. For example, a group may be listening to a track while one member of the group is listening to another version of the same track. For example, the member may access a PG version of a track when the group is accessing an R rated version, or the member may be accessing the track in a different language. Then when the group is listening to a song or watching a movie, various members of the group may have access to their preferred audio.

Group members may have access to, or be restricted from using, a number of playlist and group functionalities. For example, group members may have permission to add to or manipulate a playlist. According to an embodiment, some group members may have limited manipulation abilities, for example a group member may be permitted to add a song to a playlist but not to remove a song, or not to skip a song.

In an embodiment, when a master leaves a group, another group member may be made the master. For example, control of the playlist may be transferred to another group device. When control of the playlist is passed to a second group device, state information for the player plugin (PP) may be transferred or otherwise updated. State information may include an identification for any radio or streaming service being played by the group, the current state of the playlist, a podcast feed, an episode guide, and the like.

As discussed herein, a group member may own or be licensed digital rights to an audio file for playback. A group member's digital rights may determine whether a song may be distributed to all group members. Whether a group member has a right to play or share the audio file may be indicated by the contents of the device. In an embodiment, if an audio file is properly encrypted and includes an appropriate distribution key, the audio file may be shared with other group members, e.g., added to a group playlist and played at a playback device.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

Some embodiments may be implemented, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine-readable media configured to store machine executable program instructions. The features of the embodiments of the present invention may be implemented in hardware, software, firmware, or a combination thereof and utilized in systems, subsystems, components or subcomponents thereof. The machine-readable storage media may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and client devices. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, the sequence of a recitation of a particular method in a claim does not require that that sequence is essential to an operable claim. Rather, particular method elements or steps could be executed in different orders without departing from the scope or spirit of the invention.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for controlling playback of a media track, the method comprising:
   at a first one of a plurality of member devices that form a group:
      maintaining a member list identifying the plurality of member devices; maintaining a playlist comprising an identifier of at least one media track and a network resource location from which the media track may be retrieved;
      controlling playback of the at least one media track at another of the plurality of member devices on the member list by transmitting the playlist to the member device; and
   upon detecting that the first one of the plurality of member devices no longer controls the group, transferring control of the playback to a second one of the plurality of member devices,
   wherein the transferring control comprises:
      after determining to transfer control of the playback to the second one of the plurality of member devices, capturing a current state of the playlist at the first one of the plurality of member devices, and
      transferring information regarding the current state of the playlist from the first one of the plurality of member devices to the second one of the plurality of member devices to be used by the second one for playback control.

2. The method of claim 1, wherein the second one of the plurality of playback devices is a speaker.

3. The method of claim 1, wherein transferring control of the playback to the second one of the plurality of member devices comprises transferring, by the first one of the plurality of member devices, credentials that authorize playback of the at least one media track to the second one of the plurality of member devices.

4. The method of claim 1, further comprising distributing, by the first one of the plurality of member devices, member list information to each other member device in the plurality of member devices.

5. The method of claim 1, further comprising distributing, by the first one of the plurality of member devices, playlist information to each other member device in the plurality of member devices.

6. The method of claim 1, further comprising:
   upon detecting an addition of a new device to the group, adding the new device to the member list by updating the member; and
   transferring information regarding the current state of the playlist to the new device.

7. The method of claim 1, wherein the controlling playback of the at least one media track at another of the plurality of member devices includes:
   identifying, by the first one of the plurality of member devices, a location of the at least one media track on the playlist;
   transmitting a track identifier including the identified location information to the other of the plurality of member devices for retrieval and playback by the other of the plurality of media devices.

8. The method of claim 1, wherein the controlling playback comprises controlling the playback of a first media track at a first device of the plurality of member devices and a second media track at a second device of the plurality of member devices, wherein the first and second media tracks are of different versions.

9. A non-transitory computer-readable medium storing program instructions that, when executed, cause a processor to perform a method, the method comprising:
   at a first one of a plurality of member devices that form a group: maintaining a member list identifying the plurality of member devices;
      maintaining a playlist comprising an identifier of at least one media track and a network resource location from which the media track may be retrieved;

controlling playback of the at least one media track at another of the plurality of member devices on the member list by transmitting the playlist to the member device; and upon detecting that the first one of the plurality of member devices no longer controls the group, transferring control of the playback to a second one of the plurality of member devices, wherein the transferring control comprises:
after determining to transfer control of the playback to the second one of the plurality of member devices, capturing a current state of the playlist at the first one of the plurality of member devices, and transferring information regarding the current state of the playlist from the first one of the plurality of member devices to the second one of the plurality of member devices to be used by the second one for playback control.

10. The non-transitory computer-readable medium of claim 9, wherein the second one of the plurality of playback devices is a speaker.

11. The non-transitory computer-readable medium of claim 9, the method further comprising transferring credentials that authorize playback of the at least one media track to the second one of the plurality of member devices.

12. The non-transitory computer-readable medium of claim 9, the method further comprising distributing, by the first one of the plurality of member devices, member list information to each other member device in the plurality of member devices.

13. The non-transitory computer-readable medium of claim 9, the method further comprising distributing, by the first one of the plurality of member devices, playlist information to each other member device in the plurality of member devices.

14. The non-transitory computer-readable medium of claim 9, the method further comprising:
upon detecting an addition of a new device to the group, adding the new device to the member list by updating the member list at each of the at least one of the plurality of member devices that maintains the member list;
transferring information regarding the current state of the playlist to the new device.

15. The non-transitory computer-readable medium of claim 9, wherein the controlling playback comprises controlling the playback of a first media track at a first device of the plurality of member devices and a second media track at a second device of the plurality of member devices, wherein the first and second media tracks are of different versions.

16. A system comprising:
a plurality of connected devices, each device including:
a memory device to store a playlist comprising an identifier of at least one media track and a network resource location from which the media track may be retrieved, and
a processor;
wherein at least one of the plurality of devices also stores a member list identifying the plurality of devices at its memory device, and
wherein the processor of a first one of the plurality of devices is further configured to control playback at another of the plurality devices by transmitting the playlist to the other device; and
wherein upon detecting that the first one of the plurality of devices no longer controls the group, a second one of the plurality of devices is configured to assume control of the playback by capturing a current state of the playlist at the first one of the plurality of devices, and by transferring information regarding the current state of the playlist from the first one of the plurality of devices to the second one of the plurality of devices to be used by the second one for playback control.

17. The system of claim 16, wherein the second one of the plurality of playback devices is a speaker.

18. The system of claim 16, wherein the processor of the first one of the plurality of devices is configured to transfer credentials that authorize playback of the at least one media tracks to the second one of the plurality of devices.

19. The system of claim 16, wherein the processor of the first one of the plurality of devices is configured to distribute member list information to each device in the plurality of devices.

20. The system of claim 16, wherein the processor of the first one of the plurality of devices is configured to distribute playlist information to each device in the plurality of devices.

21. The system of claim 16, wherein upon detecting an addition of a new device to the group, the processor of the first one of the plurality of devices is configured to add the new device to the member list by updating the member list at each of the at least one of the plurality of devices that stores the member list and transfer information regarding the current state of the playlist from one of the plurality of devices to the new device.

22. The system of claim 16, wherein the controlling playback comprises controlling the playback of a first media track at a first device of the plurality of devices and a second media track at a second device of the plurality of devices, wherein the first and second media tracks are of different versions.

23. A method for controlling playback of a media track, the method comprising:
at a first one of a plurality of member devices that form a group:
obtaining a member list identifying the plurality of member devices;
obtaining a playlist comprising an identifier of at least one media track and a network resource location from which the media track may be retrieved,
wherein the member list and the playlist are maintained by a second one of the plurality of member devices;
playing back of the at least one media track from the playlist, wherein the playing is controlled by the second one of the plurality of member devices by transmitting the playlist from the second member device to the first member device; and
upon an event that removes the second one of the plurality of member devices from the group, assuming control of the playback of the at least one media track, the assumption of control comprising:
maintaining the member list,
maintaining the playlist, and
controlling playback at another of the plurality of member devices
by capturing a current state of the playlist at the second one of the plurality of member devices, and
by transferring information regarding the current state of the playlist from the second one of the plurality of member devices to the another one of the plurality of member devices to be used by the another one for playback control.

24. The method of claim 23, further comprising distributing, by the second one of the plurality of member devices, member list information to each other member device in the plurality of member devices.

* * * * *